(12) United States Patent
Kant

(10) Patent No.: US 10,349,266 B1
(45) Date of Patent: Jul. 9, 2019

(54) METHOD AND SYSTEM FOR PROGRAMMATICALLY CHANGING THE (U)SIM PARAMETERS TO AID PROVISIONING AND DISTRIBUTION OF INTERNET OF THINGS DEVICES GLOBALLY

(71) Applicant: Nishi Kant, Fremont, CA (US)

(72) Inventor: Nishi Kant, Fremont, CA (US)

( * ) Notice: Subject to any disclaimer, the term of this patent is extended or adjusted under 35 U.S.C. 154(b) by 0 days.

(21) Appl. No.: 15/878,382

(22) Filed: Jan. 23, 2018

(51) Int. Cl.
| | |
|---|---|
| *H04B 1/3816* | (2015.01) |
| *H04W 4/14* | (2009.01) |
| *H04W 8/18* | (2009.01) |
| *H04W 88/06* | (2009.01) |

(52) U.S. Cl.
CPC .......... *H04W 8/183* (2013.01); *H04B 1/3816* (2013.01); *H04W 4/14* (2013.01); *H04W 88/06* (2013.01)

(58) Field of Classification Search
CPC ......... H04W 4/70; H04W 4/50; H04W 88/06; H04B 1/3816
See application file for complete search history.

(56) References Cited

U.S. PATENT DOCUMENTS

| | | | | |
|---|---|---|---|---|
| 2011/0230188 | A1* | 9/2011 | Gemski | H04W 60/00 455/435.1 |
| 2015/0296379 | A1* | 10/2015 | Nix | H04L 9/0869 713/171 |
| 2017/0019750 | A1* | 1/2017 | Palanisamy | H04W 28/0289 |
| 2017/0331577 | A1* | 11/2017 | Parkvall | H04J 11/0079 |
| 2017/0331670 | A1* | 11/2017 | Parkvall | H04J 11/0079 |

* cited by examiner

*Primary Examiner* — Diane D Mizrahi

(57) ABSTRACT

The embodiments described herein relate generally to a method and system for using mobility management entity (MME), Signaling Transfer Point (STP), Services Capability Exposure Functions (SCEF) in a 3G or 4G network and adding an application using USIM application toolkit resident in the USIM of an IoT device (UE) whereby it could use location information (i.e., broadcast public land mobile network (PLMN), Time Information, cell identification etc. to update the subscriber identification information or alternatively get an instruction from the network to do so The updated identity could help device in getting served by a nearby service nodes.

21 Claims, 5 Drawing Sheets

METHOD AND SYSTEM FOR PROGRAMMATICALLY CHANGING THE (U)SIM PARAMETERS TO AID PROVISIONING AND DISTRIBUTION OF INTERNET OF THINGS DEVICES GLOBALLY

FIELD OF THE INVENTION

The present invention relates generally to general packet radio service (GPRS) networks and its evolution including but not limited to third generation 3G Universal Mobile Telecommunication System (UMTS) and fourth generation 4G Long Term Evolution (LTE). More particularly, this invention relates to a method and system for using (U)SIM (Universal Subscriber Identity Module), USIM Application Toolkit (USAT), UE (User Equipment) and backend databases such as HSS (Home Subscriber Server) or a substitute that maps the IMSI of a connected device to a subscriber profile or issue command to the SIM Toolkit to change the IMSI for optimal routing of signaling messages from the device.

BACKGROUND

Mobile broadband data networks are becoming pervasive in modern day life. Their expansive reach is appealing not just to humans but to connect Internet of Things (IoT) devices as well where devices like smart meters, sensors, vehicles continuously generate data that can be used for better security, efficiency or lower cost of the business operation. The mobile broadband network includes 3rd Generation (3G)/4th Generation (4G) networks and hybrid networks combining Wi-Fi access with 3G/4G networks.

The expectations and device characteristics for IoT differ quite substantially from those used by humans such as smartphones. The IoT devices could be very low powered, fixed in one location for years and communicating sporadically at low data rate or they could be always connected to power supply, constantly streaming video at high rate and anything in between. Regardless, in all these cases sending a human to the device, for the purpose of configuring, updating or fixing a device/connectivity is highly undesirable. IoT devices do not have a screen for user interaction. Moreover, for most of IoT devices, the 3G/4G connectivity module must be assembled at the time of manufacturing. Given the global nature of business, such devices could be manufacture in one country and may be deployed in another country by an enterprise that is headquartered in yet another country. Since mobile operators have networks that are tied to specific geographies where they are licensed, it creates an interesting situation for an operator who wants to serve the enterprise globally by leveraging roaming relationships and who are willing to deploy additional systems in distributed locations to serve such enterprises. While doing so they would not want to mix the IoT traffic with human consumer traffic and hence need mechanism to steer traffic from IoT system locally. GSMA has introduced the concept of embedded SIM (eSIM) for IoT which could dynamically receive profile for specific operators and connect the IoT device to that particular operator. However, this adds new complexities in business relationship and does not help an operator in offering global service.

SUMMARY

Aspects of the disclosure herein include assigning a provisioning identification information in the (U)SIM of the IoT device (UE) at the time of being assembled into the IoT device during the manufacturing process. This provisioning identification would be agnostic to actual network or place the IoT device will be used and would be subject to modification.

Another aspect of the disclosure herein includes a computer implemented method for the modification of the above-said identification information in a (U)SIM of the IoT device (UE) in order to steer the signals for the mobile network authentication or the retrieval of subscriber profile to a nearby database after the IoT devices is installed in the desired location and communicates with the backend using the provisioning identification.

Aspects of the disclosure herein include a computer implemented method for reprovisioning identification information in the USIM, the method comprising: send a provisioning signal to an application built using the USIM Application Toolkit (USAT) and residing on the said USIM by using a) SMS, b) Over The Air Provisioning (OTAP) messages or c) by using logic in the SIM toolkit to create a new identification number.

Other aspects of the disclosure herein include a system having a plurality of network elements for reprovisioning identification information in a USIM and steering signals received from the UE to a predetermined address of a backend server IoT DB instead of HSS with logic to interpret the old and new identification number and then to map them both to the same subscriber record.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
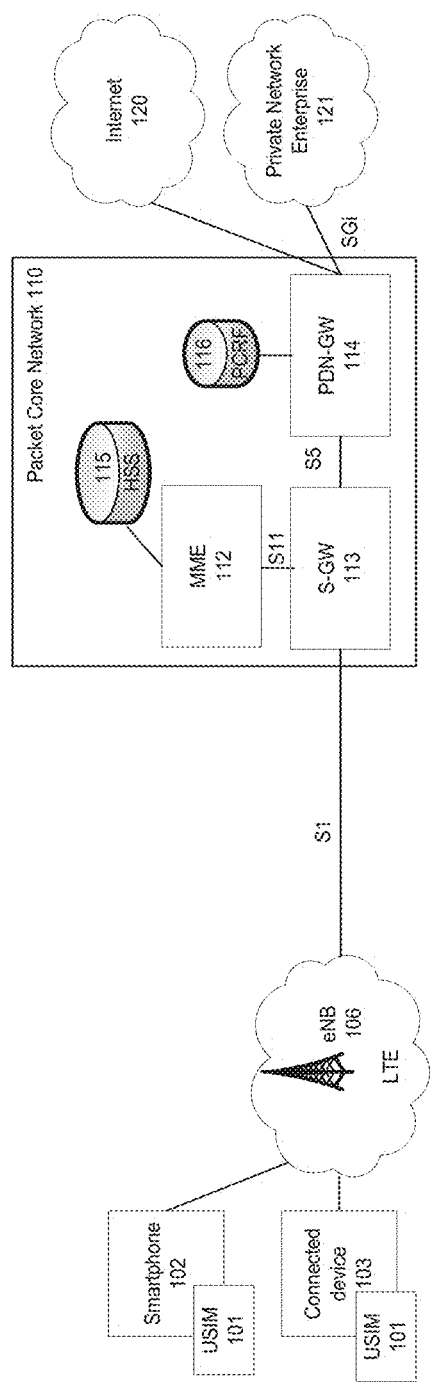
FIG. 1 is a schematic illustrating a prior art an operator network serving smartphone and connected (IoT) device.

Device characteristics and communication need differ widely for the IoT devices. A mobile operator typically servers a region, country or specific geography where is it licensed to operate spectrum by the respective regulator. Such arrangement works fine for the human consumer market and the traditional mobile networks were designed as such. While a typical mobile network, as shown in FIG. 1, is capable of providing the connectivity to the IoT devices, it limits the use cases to those being local to the home operator. For many Enterprise use cases the IoT devices are purchased in volume and deployed wherever Enterprise does business and often globally. If such IoT devices need cellular connectivity, the Enterprise would typically want to deal with one operator even though most operators have their network in certain geographic areas. Operators typically have roaming relationships amongst them and can provide network coverage using roaming. However, if IoT signaling and traffic is handled same way as those for occasional human roamer, the home operator will not have enough flexibility to serve global businesses involved in use cases such as connected cars, smart meters, factories in multiple geographies, fleet management etc. In such B2B (Business to Business) relationship, the operator would want to serve the Enterprise efficiently by locating authentication database (HSS equivalent) and data gateway (P-GW) close to the Enterprise being served even in places where it is not the home operator and depends on the coverage provided by the visited network (VPMLN). 3GPP specifications allow the home operator to specify which P-GW is to be used while UE roams In a visited network. Home operator can distribute such P GWs geographically.

FIG. 1 is a schematic showing a network sharing scenario with a variety of UEs (e.g., 102, 103) having a USIM card 101 able to attach to a prior art Core Network 110 in which the UE mutually authenticate with the HSS 115 using USIM 101 through the MME 112. The MME then sets up a data connection (bearer) between UE and S-GW 113 and through the P-GW 114 to the Enterprise network 121 or the Internet 120.

3rd Generation Partnership Project (3GPP) TS 31.111 describes USIM Application Toolkit (USAT) 202 using which authorized applications resident on the USIM can securely read and write information from and to the USIM. It can also interact with backend servers using SMS or other means. When the UE attempts to connect to a network, it includes the IMSI in the signaling. The Mobile Country Code (MCC) 31 and Mobile Network Code (MNC) 32 allow the MME 212 to realize that the USIM belongs to a different operator and it must route the authentication message to the STP 217 which can then send it to right HSS or HSS like database for IoT devices, the IoT DB 225. The IoT DB is an enhancement over HSS whereby as per this disclosure, it includes additional capability to track multiple IMSIs associated with a subscription profile and logic to coordinate with USAT as to which IMSI is considered active. An operator can have more than one MNC and can dedicate MNCs for specific purposes. Ericsson U.S. Patent Publication No. 20110230188, filed Jan. 10, 2011, which is hereby incorporated herein by reference, discloses extending the standard mechanism that allows node selection for a specific purpose based on bits of IMSI after the mobile network code (MNC) depicted as IND 34.

3GPP has defined a new class of IoT connectivity NB-IoT in TS 23.401 which introduces new network elements such as SCEF 2b18. In case of roaming scenario, the SCEF connects to its counterpart SCEF or its equivalent IoT system 2b27 in the home network. As per this invention an equivalent function is shown as IoT sys 2b27 which is an enhancement over SCEF and included the ability to work with multiple IMSIs per subscription.

An aspect of the preferred embodiment is to use special encoding of the IMSI to indicate that it is intended for IoT specific provisioning and is subject to modification. As explained earlier this could be achieved by using a special MNC or by putting special value in the IND part of the MSIN in the IMSI. As per 3GPP specifications, signaling including the "provisioning" IMSI will reach the HSS equivalent IoT DB for authentication. Upon successful authentication, the IoT DB will provide corresponding subscriber profile to the MME. The MME then sets up a data connection (bearer) between UE and S-GW and through the P-GW to the Enterprise network or the Internet.

An aspect of the preferred embodiment is to use the USIM with home operator approved or supplied specific USAT application which can modify the IMSI stored in the USIM. The decision to update IMSI could be autonomous, time bound, based on network trigger or based on specific condition such as determination of location by reading MCC, MNC and Cell Id off the broadcast information. This IMSI update can happen any time after provisioning IMSI has been authenticated successfully as described in the previous step. Since IMSI is used to identify which subscriber profile should be used for authentication and services, it is essential that USAT app and the IoT DB follow exact same logic to derive updated IMSI. While this embodiment is described with USAT, it should be clear to those skilled in art that this concept could be extended to other mechanisms such as an authorized application with USIM access or Over the Air Provisioning (OTAP) operations. Typically, OTAP is used for variety of administrative activities and is considered a secure operation.

Figure 2:
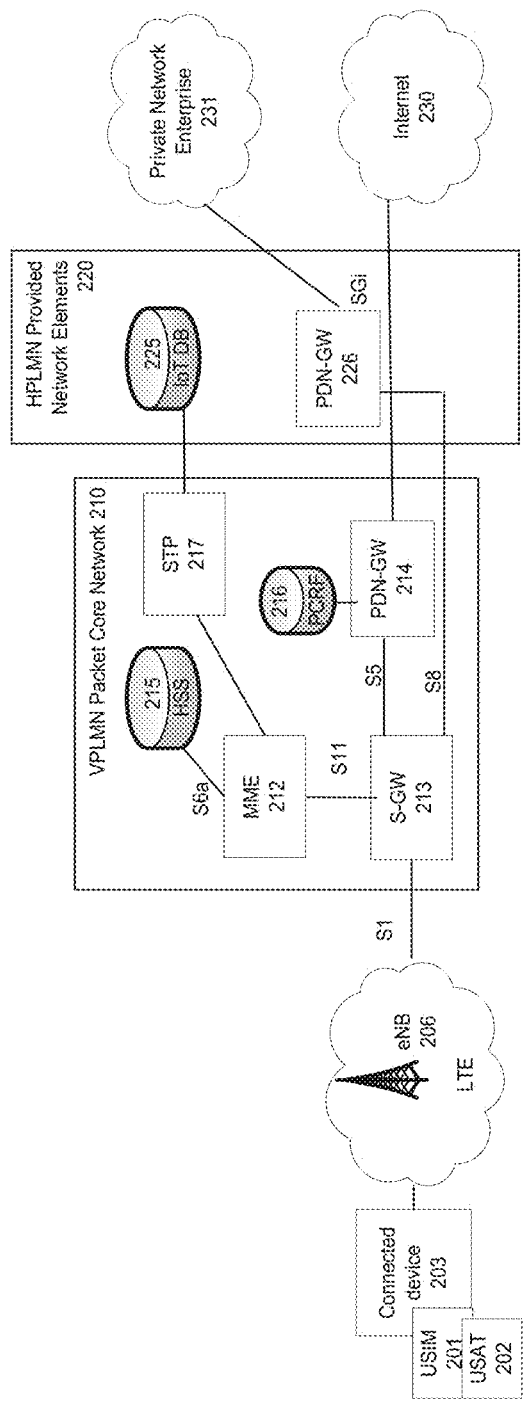
FIG. 2 shows an arrangement where the home operator (HPLMN) is using IoT DB which is an enhancement of HSS as per this disclosure and a USIM Toolkit application as per the implementations of the embodiments described herein.
Figure 2B:
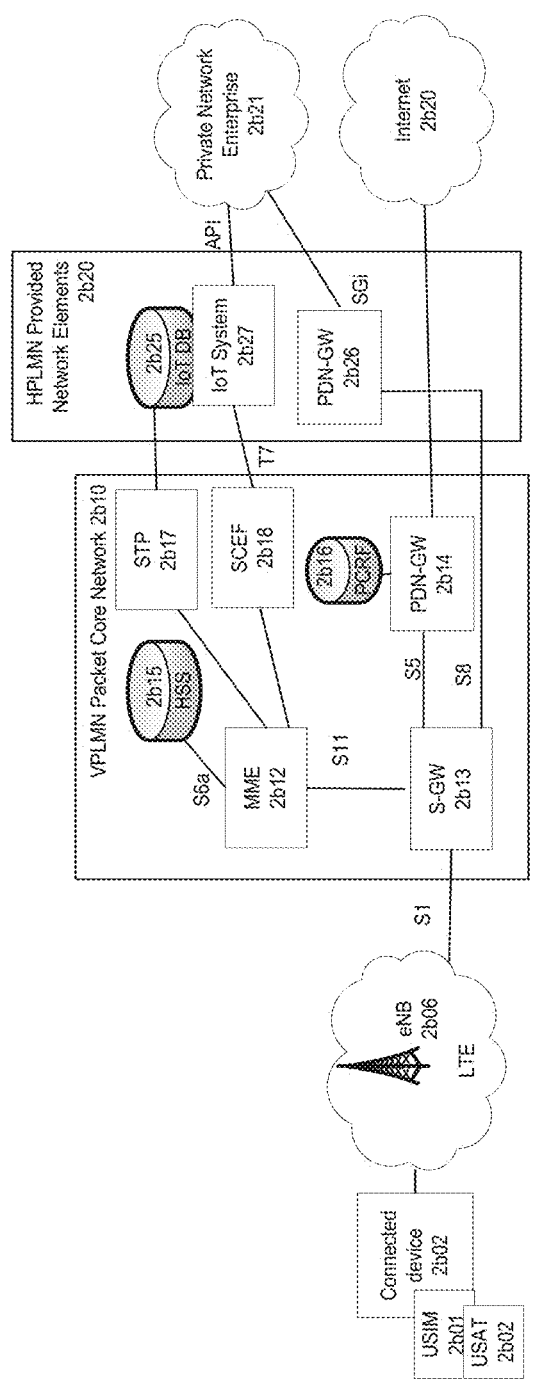
FIG. 2b shows an arrangement where the home and visited operators support Narrowband IoT (NB-IoT) and have new network elements such as SCEF and its enhanced version as per this disclosure IoT System.
Figure 3:
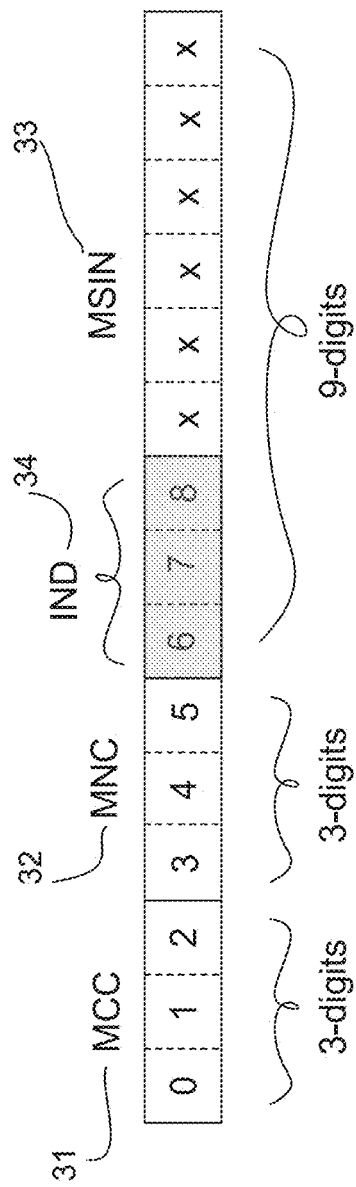
FIG. 3 is a schematic illustrating encoding of subscriber identity IMSI.

As disclosed herein and illustrated by FIG. 2b, the method can be extended to evolved networks supporting NB-IoT. Where the visited SCEF is expected to select home operators SCEF equivalent IoT System 327 based on the initial identity IMSI.

Another aspect of the preferred embodiment is for home operator to use specific MNC for IoT provisioning where IMSI update is expected.

Another aspect of the preferred embodiment is for home operator to use geographically distributed IoT DBs and IoT system that are interconnected. This allows any IoT DB to migrate subscriber profile and keys securely to an instance closer or move convenient for particular IoT device(s). The IMSI update procedure can choose encoding of IMSI to steer interaction of IoT device to the said closer or convenient IoT DB. It should be clear to those skilled in art that this method could be extended to IoT sys in the system where NB-IoT is supported. The operator can locate these systems arbitrarily close to the served Enterprise or the served IoT devices.

An aspect of the preferred embodiment is to have reliable and fail-safe method for IMSI update on the USIM and the IoT DB. Both system will allow fall back window whereby if authentication with updated IMSI is fails both ends revert back to old good IMSI. Upon a successful authentication with new IMSI, both ends can delete the old IMSI. Updating of IMSI can be done zero or any number of times to suit mobile operator's business needs.

While this disclosure implements the embodiments of this disclosure in context of a $4^{th}$ generation 4G network and used 4G network elements to illustrate the concepts, it is applicable to 3G networks as well since USIM and HSS including similar operations are used in 3G network as well. Similarly, if USIM is used over Wi-Fi using EAP-SIM, EAP-AKA or EAP-AKA' methods, this disclosure is applicable.

Since cellular networks are globally deployed, any operator can offer global IoT service using their roaming relationships and make it more efficient by using method disclosed here.

Figure 4:
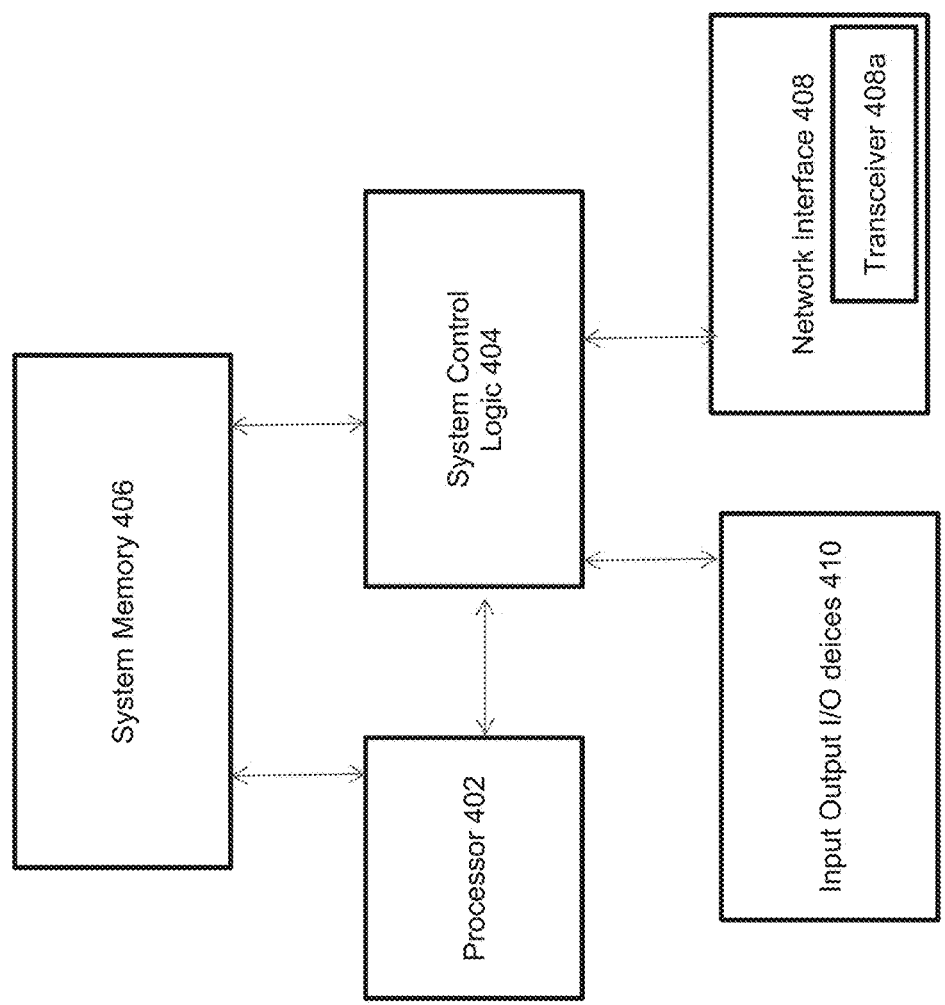
FIG. 4 is a block diagram of an exemplary computer implementation that could be used by embodiments.

FIG. 1 shows network elements of prior art mobile network. FIG. 2 and FIG. 2b show additional network elements USAT application, IoT DB and IoT Sys. The network element may have a controller, logic, memory, interface, and input/output which may be implemented using any suitable hardware, software and/or firmware configured as shown in FIG. 4. FIG. 4 comprises one or more system control logic 404 coupled with at least one or all of the processor(s) 402, system memory 406, a network interface 408 (including a transceiver 408a), and input/output (I/O) devices 410. The processor(s) 402 may include one or more single-core or multi-core processors. The processor(s) 402 may include any combination of general-purpose processors and dedicated processors (e.g., graphics processors, application processors, baseband processors, etc.). System control logic 404 may include any appropriate interface controllers to provide for any suitable interface to at least one of the processor(s) 402 and/or to any suitable device or component in the packet core network in communication with system control logic 404. System control logic 704 may include one or more memory controller(s) to provide an interface to system memory 406. System memory 406 may be used to load and store data and/or instructions such as the knowledge database and logger function discussed above. System memory 406 may include any suitable volatile memory, such as suitable dynamic random access memory (DRAM), for example. System memory 406 may also include non-volatile memory including one or more tangible, non-transitory computer-readable media used to store data and/or instructions, for example, such as the embodiments described herein. The non-volatile memory may include flash memory, for example, and/or may include any suitable non-volatile storage device(s), such as one or more hard disk drive(s) (HDD(s)), one or more compact disk (CD) drive(s), and/or one or more digital versatile disk (DVD) drive(s). The memory 406 may include a storage resource physically part of a device. For example, the memory 404 may be accessed over a network via the network interface 408 and/or over Input/Output (I/O) devices 410. The transceiver in network interface 408 may provide a radio interface to communicate over one or more network(s) and/or with any other suitable device. Network interface 408 may include any suitable hardware and/or firmware. The network interface 408 may further include a plurality of antennas to provide a multiple input, multiple output radio interface. Network interface 408 may include, for example, a wired network adapter, a wireless network adapter, a telephone modem, and/or a wireless modem. For one embodiment, at least one of the processor(s) 402 may be packaged together with logic for one or more controller(s) of system control logic 404. At least one of the processor(s) 402 may be integrated on the same die with logic for one or more controller(s) of system control logic 404. In various embodiments, the I/O devices 410 may include user interfaces designed to enable user interaction with peripheral component interfaces designed to enable peripheral component interaction and/or sensors designed to determine environmental conditions and/or location information related to the network element or system. In various embodiments, the peripheral component interfaces may include, but are not limited to, a non-volatile memory port, a universal serial bus (USB) port, an audio jack, and a power supply interface.

Alternatively, some embodiments and methods discussed above may be implemented by a non-transitory computer-readable medium storing a program for performing the process. The computer readable medium may store (in any appropriate format) those program elements which are appropriate to perform the method. The term "non-transitory computer readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media may include, for example, optical or magnetic disks and other persistent memory. Volatile media may include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, a Random Access Memory (RAM), a programmable read only memory (PROM), an erasable programmable read only memory (EPROM), a flash electrically erasable programmable read only memory (FLASH-EEPROM), any other memory chip or cartridge, a carrier wave as described hereinafter, or any other medium from which a computer can read.

In an embodiment, a server computer, network element or centralized authority may not be necessary or desirable. For example, an embodiment may be practiced on one or more devices without a central authority. In such an embodiment, any functions described herein as performed by the server computer or data described as stored on the server computer may instead be performed by or stored on one or more such devices.

Although process (or method) steps may be described or claimed in a particular sequential order, such processes may be configured to work in different orders. In other words, any sequence or order of steps that may be explicitly described or claimed does not necessarily indicate a requirement that the steps be performed in that order unless specifically indicated. Further, some steps may be performed simultaneously despite being described or implied as occurring non-simultaneously (e.g., because one step is described after the other step) unless specifically indicated. Moreover, the illustration of a process by its depiction in a drawing does not imply that the illustrated process is exclusive of other variations and modifications thereto, does not necessarily imply that the illustrated process or any of its steps are necessary to the embodiment(s), and does not imply that the illustrated process is preferred.

In this disclosure, devices or networked elements that are described as in "communication" with each other or "coupled" to each other need not be in continuous communication with each other or in direct physical contact, unless expressly specified otherwise.

In the foregoing specification, embodiments have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

The invention claimed is:

1. A computer implemented method for modifying subscriber identification information in a Universal Subscriber Identity Module (USIM) in a User Equipment (UE), the method comprising:
   receiving the signal containing the subscriber identification information from the User Equipment (UE) to a predetermined address of an Internet of Things Database Server (IoT DB),
   assigning a new subscriber identification information for the subscriber while maintaining the association with the predetermined address of the IoT DB; and
   sending a reprovisioning signal containing the new subscriber identification information to the USIM situated in the UE;
   updating the storage field associated with subscriber identification in the USIM situated in the UE;

receiving a signal at a control node from the UE including the new subscriber identification information and forwarding the signal to the predetermined address of the IoT DB;

associating the new identification information at the IoT DB with the original subscriber with which the old subscriber identification information was associated;

setting a flag to mark that new identification information is active.

2. The method of claim 1 further comprising:

sending a reprovisioning signal from the IoT DB to an USIM Application Toolkit (USAT) Application (USAT app) through a Short Messaging Service (SMS) message which includes information on new identification and instructions on when to write that the new identification to the USIM card.

3. The method of claim 2, wherein the reprovisioning signal further includes an updating precondition for the UE identification information which depends on the location of the UE.

4. The method of claim 2, wherein the reprovisioning signal includes the new subscriber identifier sent to the USAT app.

5. The method of claim 2, wherein the reprovisioning signal sent to the USAT app further includes an updating precondition for the identification information at certain time of the date.

6. The method of claim 2, wherein the failure in using new subscriber identity causes roll back to old subscriber identity at both USIM and IoT DB.

7. The method of claim 2, wherein the after successful update of subscriber identity, IoT DB transfers the subscriber profile to another instance of IoT DB deemed more suitable to serve the UE.

8. The method of claim 1, further comprising:

sending a reprovisioning signal from the IoT DB to an USAT app through Over The Air Provisioning (OTAP) message which includes information on new identification and instructions on when to write the new identification to the USIM card.

9. The method of claim 1, further comprising:

The USAT app initiating a reprovisioning signal towards the IoT DB via SMS based on configurable triggers at the USAT app which includes the indication to initiate the identity update.

10. The method of claim 1 wherein the control node is one of a group consisting of: a Mobility Management Entity (MME) and a Signaling Transfer Point (STP).

11. The method of claim 1 wherein the control node is one of a group consisting of: a Mobility Management Entity (MME) and a Services Capability Exposure Function (SCEF).

12. The method of claim 1, wherein the UE is an Internet of Things (IoT) device connected over cellular 3G/4G network or via interwoked Wireless Local Area Network (WLAN).

13. The method of claim 1, wherein the control node belongs to a partner cellular network under roaming interconnection arrangement among operators.

14. A system having a plurality of network elements for communicating reprovisioning signal carrying the new subscriber identification information to a USIM in a UE and then steering signals received from the UE to a predetermined address of an IoT DB based on information contained In the subscriber identifier, the system comprising:

An IoT DB with correlated subscriber identities; a network capable for communicating reprovisioning signal between IoT DB and an USAT application (USAT app) located in the USIM card of the UE; USAT app containing programmed instructions to update the subscriber identification information contained in the USIM card of the UE; and a control node to steer the signal from UE to a predetermined address of an IoT DB based on the information contained in the subscriber identifier.

15. The system of claim 14 comprising:

an IoT DB configured to send a reprovisioning signal to the UE through SMS that includes new subscriber identifier and instructions on when to update subscriber identifier on the USIM card.

16. The system of claim 14 comprising:

an Over The Air Provisioning (OTAP) server configured to send upon receiving indication from IoT DB, a reprovisioning signal to the UE which includes new subscriber identifier and instructions on when to update subscriber identifier on the USIM card.

17. The system of claim 14, wherein the application includes an updating precondition for the subscriber identification information in the USIM which depends on the location of the UE.

18. The system of claim 14, wherein the application includes an updating precondition for the subscriber identification information in the USIM which depends on certain time of a date.

19. The system of claim 14 wherein the control node is one of a group consisting of: a Mobility Management Entity (MME), Signaling Transfer Point (STP) and a Services Capability Exposure Function (SCEF).

20. The system of claim 14, wherein the UE is an Internet of Things (IoT) device connected over cellular 3G/4G network or via interwoked Wireless Local Area Network (WLAN).

21. The system of claim 14, wherein the control node belongs to a partner cellular network under roaming interconnection arrangement among operators.

* * * * *